(12) United States Patent
Normark et al.

(10) Patent No.: US 8,422,601 B2
(45) Date of Patent: Apr. 16, 2013

(54) SPREAD SPECTRUM SIGNAL PROCESSING

(75) Inventors: Per-Ludvig Normark, Frösön (SE); Christian Ståhlberg, Alunda (SE)

(73) Assignee: Nordnav Technologies AB, Lulea (SE)

( * ) Notice: Subject to any disclaimer, the term of this patent is extended or adjusted under 35 U.S.C. 154(b) by 1279 days.

(21) Appl. No.: 11/864,342

(22) Filed: Sep. 28, 2007

(65) Prior Publication Data

US 2008/0095272 A1    Apr. 24, 2008

Related U.S. Application Data

(63) Continuation of application No. 10/531,132, filed as application No. PCT/SE03/01544 on Oct. 3, 2003, now abandoned.

(30) Foreign Application Priority Data

Oct. 15, 2002  (SE) ...................................... 0203047

(51) Int. Cl.
*H04L 27/06* (2006.01)
*H04B 1/69* (2011.01)

(52) U.S. Cl.
USPC .......................................... 375/343; 375/150

(58) Field of Classification Search .................. 375/316, 375/343, 130, 140, 141, 147, 150; 342/357.2, 342/357.22–357.24, 357.4, 357.41–357.44; 701/207, 213; 340/426.19, 539.11, 539.13
See application file for complete search history.

(56) References Cited

U.S. PATENT DOCUMENTS

| | | | |
|---|---|---|---|
| 5,592,173 | A | 1/1997 | Lau et al. |
| 5,808,582 | A | 9/1998 | Woo |
| 5,897,605 | A | 4/1999 | Kohli et al. |
| 6,311,129 | B1 | 10/2001 | Lin |
| 6,400,753 | B1 | 6/2002 | Kohli et al. |
| 6,407,699 | B1 | 6/2002 | Yang |
| 6,512,803 | B2 | 1/2003 | Heinzl et al. |

(Continued)

FOREIGN PATENT DOCUMENTS

| | | |
|---|---|---|
| EP | 1054265 A2 | 11/2000 |
| JP | 2002-199035 | 7/2002 |

(Continued)

OTHER PUBLICATIONS

International Search Report (Swedish Patent Office) for PCT/SE03/01544, date of mailing Jan. 19, 2004.

(Continued)

*Primary Examiner* — Tesfaldet Bocure
(74) *Attorney, Agent, or Firm* — Alston & Bird LLP

(57) ABSTRACT

The present invention relates to processing of spread spectrum signals, where a continuous signal of a comparatively high frequency is received. This signal is sampled at a basic sampling rate whereby a resulting sequence of time discrete signal samples is produced, which are in turn quantized into a corresponding level-discrete sample value. A plurality of data words are formed, which each includes one or more consecutive sample values. Information obtained from these data words is correlated with at least one representation of a signal source specific code sequence, which has been pre-generated in the form of a code vector. The correlation step specifically involves correlating at least each vector in a sub-group of the code vectors with at least one vector that has been derived from the data word. Thereby resulting data is produced.

7 Claims, 5 Drawing Sheets

U.S. PATENT DOCUMENTS

| | | | |
|---|---|---|---|
| 6,526,322 | B1* | 2/2003 | Peng et al. .......................... 700/5 |
| 6,828,935 | B1* | 12/2004 | Dunn et al. .................... 342/375 |
| 7,010,060 | B2* | 3/2006 | Ledvina et al. ............... 375/147 |
| 7,305,021 | B2 | 12/2007 | Ledvina et al. |
| 2002/0012411 | A1 | 1/2002 | Heinzl et al. |
| 2002/0015456 | A1 | 2/2002 | Norman et al. |
| 2002/0025006 | A1* | 2/2002 | Mehrnia et al. ............... 375/316 |
| 2002/0027949 | A1 | 3/2002 | Lennen |
| 2003/0058928 | A1* | 3/2003 | King ............................. 375/147 |
| 2003/0223477 | A1* | 12/2003 | Loomis et al. ................. 375/147 |
| 2004/0213334 | A1 | 10/2004 | Ledvina et al. |
| 2006/0013287 | A1* | 1/2006 | Normark et al. ............... 375/142 |
| 2006/0227856 | A1* | 10/2006 | Ledvina et al. ............... 375/150 |
| 2010/0295727 | A1* | 11/2010 | Duffett-Smith et al. . 342/357.77 |

FOREIGN PATENT DOCUMENTS

| | | |
|---|---|---|
| WO | WO 97/40398 | 10/1997 |
| WO | WO 98/11451 | 3/1998 |
| WO | WO 01/03294 | 1/2001 |
| WO | WO 01/77705 | 10/2001 |
| WO | WO 02/50561 | 6/2002 |
| WO | WO 03/017503 | 2/2003 |

OTHER PUBLICATIONS

Braasch, M. S., "GPS Receiver Architectures and Measurements," Proceedings of the IEEE, vol. 87, No. 1, Jan. 1999, p. 48-64.

Asai T., et al., "TUPM 12.4: Software Solution of GPS Baseband Processing", ULSI Laboratory, Mitsubishi Electronic Corporation, IEEE, 1998.

Akos, D.M., et al., "Tuning in to GPS—Real-Time Software Radio Architectures for GPS Receivers", GPS World, Jul. 2001, pp. 28-33.

Dovis, F., et al., "Design and Test-Bed Implementation of a Reconfigurable Receiver for Navigation Applications", Electronics Department, Politecnico di Torino, Navigation Signal Analysis and Simulation Group, Spring of 2002.

Hansson, A., et al., "Global Positioning System in a Digital Signal Processor for the TMS320 DSP Platform", Texas Instrument Application Report, Apr. 2001.

Akos, D.M., et al., "Real-Time GPS Software Radio Receiver", ION National Technical Meeting, Jan. 22-24, 2001, Long Beach, CA, pp. 809-816.

Akos, D.M., et al., "Global Positioning System Software Receiver (gpSrx) Implementation in Low Cost/Power Programmable Processors", ION GPS 2001, Sep. 11-14, 2001, Salt Lake City, UT, pp. 2851-2858.

Van Dierendonck, A.J., "GPS Receivers", Global Positioning System: Theory and Applications, B. W. Parkinson and J.J. Spilker, Jr., Eds., vol. I, American Institute of Aeronautics and Astronautics, 1996, Chapter 8, pp. 329-406.

Ledvina, et al., "A Coming of Age for GPS: A RTLINUX Based GPS Receiver", Proceedings of the Workshop on Real Time Operating Systems and Applications and Second Real Time Linux Workshop (in conjunction with IEEE RTSS 2000), Nov. 27-28, 2000, see http://gps.ece.cornell.edu/index.html.

Fontana, R.D., et al., "The New L2 Civil Signal", Proceedings of the ION GPS 2001, Sep. 11-14, 2001, Salt Lake City, UT, see http://www.findarticles.com/cf_dls/mOBPW/9_12/78573899/p8/article.jhtml?term=.

Ledvina, et al., "A 12-Channel Real-Time GPS L1 Software Receiver", Proceedings of The ION National Technical Meeting, Jan. 22-24, 2003, Anaheim, CA, see http://gps.ece.cornell.edu/index.html.

Ledvina, et al., "Bit-Wise Parallel Algorithms for Efficient Software Correlation Applied to a GPS Software Receiver", IEEE Tranactions on Wireless Communications, vol. 3, No. 5, Sep. 2004.

Psiaki, et al., "Design and Practical Implementation of Multi-Frequency RF Front Ends Using Direct RF Sampling", Preprint from ION GPS/GNSS 2003, pp. 90-102.

Akos, D.M., "Design and Implementation of a Direct Digitization GPS Receiver Front End", IEEE Transactions on Microwave Theory and Techniques, vol. 44, No. 12, Dec. 1996, pp. 2334-2339.

Thor, Jona, "A High-Performance Real-Time GNSS Software Receiver and its Role in Evaluating Various Commercial Front End ASICs", ION GPS 2002, Sep. 24-27, 2002, pp. 2554-2560.

Fontana, et al., "The Modernized L2 Civil Signal—Leaping Forward in the $21^{st}$ Century", GPS World, Sep. 2001, pp. 28-34, www.gpsworld.com.

Search Report from corresponding European Application No. 07075508 completed Aug. 29, 2007.

Kai Hwang and Faye A. Briggs; *Computer Architecture and Parallel Processing, $3^{rd}$ edition*; 1987; pp. 21-24; McGraw-Hill Book Co.; Singapore.

Japanese Office Action for Japanese Application No. 2004-545123.

Anteneh, A. A., et al., "Embedded DSP Design for Integrated Radio Navigation," Proceedings of the ProRISC, CSSP97, Workshop on Circuits, Systems and Signal Processing, Nov. 27-28, 1997, pp. 19-24, Publisher Uknown, The Netherlands.

State Intellectual Property Office of the People's Republic of China, Notification of the First Office Action for Application No. 200380101416.2, mailed Mar. 21, 2008, 7 pages, China.

State Intellectual Property Office of the People's Republic of China, Notification of the Second Office Action for Application No. 200380101416.2, mailed Oct. 9, 2009, 7 pages, China.

European Patent Office, Communication Pursuant to Article 96(2) EPC for Application No. 03 748 840.0, dated Feb. 13, 2006, 6 pages, Germany.

Intellectual Property India, Patent Office, First Office Action for Application No. 900/KOLNP/2005, 1 page, India.

Intellectual Property India, Patent Office, Patent Office, Second Office Action for Application No. 900/KOLNP/2005, dated Oct. 23, 2008, 1 page, India.

Japan Patent Office, Official Inquiry for Application No. 2004-545123, mailed Apr. 26, 2011, 4 pages, Japan.

Korean Intellectual Property Office, Notice of Grounds for Rejection for Application No. 2005-7006645, issued Jun. 21, 2010, 5 pages, Korea.

* cited by examiner

SPREAD SPECTRUM SIGNAL PROCESSING

CROSS-REFERENCE TO RELATED APPLICATIONS

This application is a continuation of U.S. application Ser. No. 10/531,132, filed Apr. 13, 2005; which was a national stage filing under 35 U.S.C. 371 of PCT/SE2003/001544, filed Oct. 3, 2003, which International Application was published by the International Bureau in English on Apr. 29, 2004, and which are both hereby incorporated herein in their entirety by reference.

THE BACKGROUND OF THE INVENTION AND PRIOR ART

The present invention relates generally to processing of spread spectrum signals by means of vector based algorithms. More particularly the invention relates to a method of receiving spread spectrum signals and a signal receiver. The invention also relates to a computer program and a computer readable medium.

Spread spectrum technology is becoming increasingly important in many areas, of which cellular communication systems and global navigation satellite systems (GNSS) represent two important examples. Moreover, the large variety of transmission standards creates a demand for hybrid- or general-purpose receivers. For instance, both the cellular standards cdma2000 and WCDMA involve transmission of spread spectrum signals. However, due to differences in the air interfaces one and the same terminal cannot be used in the two systems. Instead, a dedicated terminal must be employed in each system. Alternatively, a dual mode terminal must be designed, which includes two separate transceiver chains. Correspondingly, a navigation receiver adapted for one GNSS, say the Global Positioning System (GPS; U.S. Government), is not able to receive signals from a satellite that belongs to a different GNSS, such as the Galileo system (the European programme for global navigation services) or the Global Orbiting Navigation Satellite System (GLONASS; Russian Federation Ministry of Defense).

In order to make this possible, a multi-mode receiver must be designed. However, including multiple receiver chains in a single device is not only expensive, it also renders the unit bulky and heavy, particularly if more than two signal formats are to be processed. Therefore, a programmable software receiver solution is desired whose signal processing principles may be altered according to which signals that shall be received and processed.

Various software solutions are already known for processing GNSS signals. The patent document WO02/50561 is one example in which a GPS receiver tracking system for guiding missiles is described. The receiving station here includes one or more processing stages for receiving and processing GPS data. A control signal controls whether a quantity of processing stages should be increased or decreased in response to the result of a correlation operation. The tracking and recovery of timing information is entirely performed in software. However, the processing involves real-time calculation of relatively complex Fourier transforms, and therefore requires considerable processing resources. Thus, a receiver of this type is not particularly suitable for small sized units, such cellular phones or portable GNSS-receivers.

The article "TUPM 12.4: Software Solution of GPS Baseband Processing", ULSI Laboratory, Mitsubishi Electric Corporation, IEEE, 1998 by Asai T., et al. outlines the principles for a software GPS receiver using an embedded microprocessor, which enables signals from up to eight satellites to be demodulated at around 40 MIPS (millions of/or Mega Instructions Per Second). A 2 MHz GPS baseband signal is here fed to the software radio receiver, which performs spectrum despreading and mixing; synchronous demodulation, satellite acquisition and tracking; as well as phase compensation. An algorithm is proposed through which the intermediate frequency (IF) signal is 1-bit sampled and where down-conversion is performed before despreading. Resulting data in the form of 32 samples are continuously processed in parallel. A DRAM (Dynamic Random Access Memory) stores a particular C/A (Coarse Acquisition) code table for each satellite from which signals are received. All other data and instructions are stored in a cache memory in order to accomplish a high-speed processing. Although this strategy is declared to result in a reasonably efficient implementation, the document lacks a specific description as to how the dispreading and the correlation should be effected in order to, in fact, obtain this effect.

Akos. D. et al., "Tuning In to GPS—Real-Time Software Radio Architectures for GPS Receivers", GPS World, July 2001 describes a receiver architecture through which IF signal samples are fed directly from a radio front-end to a programmable processor for continued processing. The article mentions the possibility of using single instruction multiple data (SIMD) instructions to process multiple data samples in parallel. However, portability- and flexibility problems are recognized, and again, there is no teaching as to how an efficient parallel processing could actually be accomplished.

Dovis, F. et al., "Design and Test-Bed Implementation of a Reconfigurable Receiver for Navigation Applications", Electronics Department, Politecnico di Torino, Navigation Signal Analysis and Simulation Group, Spring of 2002 relates to the design of a reconfigurable GNSS receiver which is capable of fusing data from two or more different GNSS:s. The document sketches an architecture which, in addition to a radio front-end, includes a Field Programmable Gate Array (FPGA) and a Digital Signal Processor (DSP). The authors address various computational load issues. However, they do not present an algorithm which fulfills the identified requirements.

Hence, the prior art includes a number of examples of software-based GNSS-receivers. Nevertheless, there is yet no distinct teaching of a highly efficient solution which is suitable for implementation in software and has capabilities that are at least in par with those of today's ASIC-based solutions for receiving and processing spread spectrum signals in real-time (ASIC=Application Specific Integrated Circuit).

SUMMARY OF THE INVENTION

The object of the present invention is therefore to provide a solution for receiving and processing spread spectrum signals, which solves the problems above and thus to present a truly software adapted strategy that may be implemented in a physically small and power efficient device.

According to one aspect of the invention the object is achieved by a method of receiving spread spectrum signals as initially described, which is characterized by comprising a preparation for the correlation step, wherein the preparation takes place before the receiving the continuous signal. This preparation involves pre-generating a multitude of code vectors, which each represents a particular code sequence of the at least one signal source specific code sequence. Moreover, according to the invention, the correlation step involves multiplying at least each vector in a sub-group of the code vectors with at least one vector, which is derived from the data word.

This strategy is advantageous because the proposed vector approach makes it possible for a digital processor (e.g. a microprocessor) to process multiple signal samples in parallel during each clock cycle and thus make very efficient use of the processor. Furthermore, by pre-generating the code vectors valuable processing capacity is saved, which in turn renders it possible to deal with a sufficient amount of input data per time unit in order to, for example track navigation signals that are transmitted by the satellites in a navigation satellite system.

According to a preferred embodiment of this aspect of the invention, each code vector represents a particular signal source specific code sequence, which is sampled at the basic sampling rate and quantised with the quantising process that is used to produce the level-discrete sample values. Preferably, the code vectors are also further adapted to the format of the incoming data signal in a way which renders the following processing efficient.

According to another preferred embodiment of this aspect of the invention, the at least one signal source specific code sequence represents so-called pseudo random noise. This type of code sequences is beneficial in environments where two or more different signals are modulated onto the same carrier frequency. Namely, the different pseudo random noise signals are orthogonal (or at least almost orthogonal) to each other. Consequently, a first information signal spread by means of a first pseudo random noise signal causes a minimal deterioration of a second information signal which is spread by means of a second pseudo random noise signal, and vice versa.

According to another preferred embodiment of this aspect of the invention, the receiving step involves down conversion of an incoming high-frequency signal to an intermediate frequency signal. The high-frequency signal is presumed to have a spectrum which is symmetric around a first frequency and the intermediate frequency signal is presumed to have a spectrum which is symmetric around a second frequency, which is considerably lower than the first frequency. Hence, the receiving step transforms the information carrying signal to a baseband which is technically more easy to handle than the band at which the original incoming signal is located.

According to another preferred embodiment of this aspect of the invention, the method includes the following steps. First, a maximum frequency variation of the second frequency due to Doppler-effects is determined. Then, a Doppler frequency interval around the second frequency is defined. The Doppler frequency interval has a lowest frequency limit equal to the difference between the second frequency and the maximum frequency variation, and a highest frequency limit equal to the sum of the second frequency and the maximum frequency variation. After that, the Doppler frequency interval is divided into an integer number of equidistant frequency steps, and subsequently a frequency candidate vector is defined for each frequency step. This way of dividing the spectrum is advantageous because it provides a flexible modeling of the intermediate carrier frequency and its variations.

According to another preferred embodiment of this aspect of the invention, an integer number of initial phase positions is determined for the frequency candidate vector. The integer number thus represents a phase resolution, such that a relatively high number corresponds to a comparatively high phase resolution, whereas a relatively low number corresponds to a comparatively low phase resolution. Furthermore, a carrier frequency-phase candidate vector is defined for each combination of carrier frequency candidate vector and initial phase position. The different frequency-phase candidate vectors are beneficial, since they allow the determination of a very accurate estimate of frequency- and phase characteristics of a received signal, which in turn vouches for a demodulated signal having a high quality.

According to yet another preferred embodiment of this aspect of the invention, the number of elements in each carrier frequency-phase candidate vector is determined. Subsequently, the carrier frequency-phase candidate vectors are stored according to a data format, which is adapted to performing multiplication operations between the data word and a segment of a carrier frequency-phase candidate vector. This adaptation is advantageous because thereby several signal samples may be processed in parallel by means of comparatively simple operators. Preferably, the adapting of the data format involves adding at least one element to each segment of the carrier frequency-phase candidate vector, such that the segment attains a number of elements which is equal to the number of elements in each of the at least one vector that is derived from the data word. Hence, it is namely possible to process a segment of the carrier frequency-phase candidate vector together with one of the at least one vector by either a so-called Single Instruction Multiple Data (SIMD)-operation or a logical XOR-operation.

According to still another preferred embodiment of this aspect of the invention, the method also includes the following steps. First, a maximum variation of the code rate due to Doppler-effects is determined. Then, a Doppler rate interval is defined around a center code rate. The Doppler frequency interval has a lowest code rate limit equal to the difference between the center code rate and the maximum code rate variation, and a highest frequency limit equal to the sum of the center code rate and the maximum code rate variation. In analogy with the intermediate frequency spectrum, the Doppler rate interval is divided into an integer number of equidistant code rate steps, and a code rate candidate is defined for each code rate step. In further analogy with the intermediate frequency, an integer number of possible initial code phase positions is determined for each code rate candidate. The integer number thus represents a code phase resolution, such that a relatively high number corresponds to a comparatively high code phase resolution, whereas a relatively low number corresponds to a comparatively low code phase resolution. Typically, the spread spectrum code modulation is less sensitive to distortion caused by Doppler effects than the frequency modulation. Therefore, the code rate steps may be relatively large. However, a certain degree of Doppler shift estimation is desirable to attain a demodulated signal of high quality.

According to yet another preferred embodiment of this aspect of the invention, a set of code vectors is generated for each signal source specific code sequence by sampling each code rate-phase candidate vector with the basic sampling rate, and thus produce a corresponding code vector. Again, this simplifies a parallel processing of several signal samples by means of comparatively simple operators.

According to still another preferred embodiment of this aspect of the invention, a modified code vector is generated on basis of each code vector by: copying a particular number of elements from the end of an original code vector to the beginning of the modified code vector, and copying the particular number of elements from the beginning of the original code vector to the end of the code vector. This extension of the code vector is highly advantageous because it allows extraction of tracking parameters through early-, prompt- and late techniques by performing a simple translation of local copies of the signal source specific code sequence.

According to still another preferred embodiment of this aspect of the invention, a set of modified code vectors is stored for each signal source specific code sequence. Each modified code vector here contains a number of elements, which represent a sampled version of at least one full code sequence. As mentioned above, the modified code vector also includes a repetition of the beginning and the end of the sequence. A particular modified code vector is defined for each combination of code rate candidate and code phase position. These pre-generated modified code vectors save considerable processing capacity in the processor, since they need not be calculated in real time, but may simply be acquired from a memory.

According to yet another preferred embodiment of this aspect of the invention, the data format of the modified code vectors is adapted with respect to the data format of the at least one vector that has been derived from the data word, such that a modified code vector and one of the at least one vector may be processed jointly by a SIMD-operation or an XOR-operation. Naturally, this is advantageous from a processing efficiency point-of-view.

According to yet another preferred embodiment of this aspect of the invention, the method involves an initial acquisition phase and a subsequent tracking phase. The acquisition phase establishes a set of preliminary parameters which are required for initiating a decoding of signals that are received during the tracking phase. The parameters may include: a modified code vector, a carrier frequency candidate vector an initial phase position, a code phase position and code index, which denotes a starting sample value for the modified code vector. A successful acquisition phase thus results in that at least one signal source specific code sequence is identified and that this signal is possible to track by the receiver (i.e. may be continued to be received).

According to still another preferred embodiment of this aspect of the invention, the tracking in turn, involves the following steps. First, based the tracking characteristics, a prompt pointer is calculated for each modified code vector. The prompt pointer indicates a start position for the code sequence. The initial prompt pointer value is set equal to the code index. Then, at least one pair of early- and late pointers is assigned around each prompt pointer. The early pointer specifies a sample value which is positioned at least one element before the prompt pointer's position, and correspondingly, the late pointer specifies a sample value being positioned at least one element after the prompt pointer's position. These pointers are used to maintain the tracking of the received signal by a repeated repositioning of the pointers around a correlation maximum value, such that the prompt pointer is positioned as close as possible to this value, the early pointer is positioned in time somewhat prior to this value and the late pointer is positioned in time somewhat after this value. An important advantage attained by this strategy is that one and the same vector may be re-used in order to represent different delays. Thus, valuable memory space and processing capacity is saved.

According to still another preferred embodiment of this aspect of the invention, the tracking involves the following further steps. First, a sequence of incoming level-discrete sample values is received. Then, data words are formed from the sample values, such that each data word contains a number of elements which is equal to the number of elements in each carrier frequency-phase candidate vector. After that, a relevant set of carrier frequency-phase candidate vectors is calculated for the data word, and a pre-generated in-phase representation respective a quadrature-phase representation of the vector is acquired for each carrier frequency-phase candidate vector in the relevant set. Subsequently, each data word is on one hand multiplied with a in-phase representation of the carrier frequency-phase candidate vector in the relevant set to produce a first intermediate-frequency-reduced information word, and on the other hand multiplied with a quadrature-phase representation of the carrier frequency-phase candidate vector in the relevant set to produce a second intermediate-frequency-reduced information word. The intermediate-frequency-reduced information words thus constitute a respective component of the vectors mentioned above that have been derived from the incoming data words. This multiplied strategy is advantageous because it enables a very efficient usage of the capacity of a general-purpose microprocessor.

According to yet another preferred embodiment of this aspect of the invention, XOR- or SIMD-operations are used to perform the multiplication between the data word and the in-phase representation of the carrier frequency-phase candidate vector respective between the data word and the a quadrature-phase representation of the carrier frequency-phase candidate vector.

According to another preferred embodiment of this aspect of the invention, the tracking involves the further steps of: correlating the first intermediate-frequency-reduced information word with a modified code vector starting at a position indicated by the prompt pointer to produce a first prompt-despread symbol string, correlating the first intermediate-frequency-reduced information word with a modified code vector starting at a position indicated by the early pointer to produce a first early-despread symbol string, correlating the first intermediate-frequency-reduced information word with a modified code vector starting at a position indicated by the late pointer to produce a first late-despread symbol string, correlating the second intermediate-frequency-reduced information word with a modified code vector starting at a position indicated by the prompt pointer to produce a second prompt-despread symbol string, correlating the second intermediate-frequency-reduced information word with a modified code vector starting at a position indicated by the early pointer to produce a second early-despread symbol string, and correlating the second intermediate-frequency-reduced information word with a modified code vector starting at a position indicated by the late pointer to produce a second late-despread symbol string. Preferably, a resulting data word is then derived for each set of the despread symbol strings. This may, for example be performed either by performing the relevant adding operation, or by looking up a pre-generated value in a table based on the bit pattern of the despread symbol strings depending on whether the resulting data words contain packed or un-packed information. Data of high quality may thus be obtained with a minimum of real time calculations, which is advantageous from a processing point-of-view.

According to yet another preferred embodiment of this aspect of the invention, either XOR- or SIMD-operations are used also to perform the multiplication between the intermediate-frequency-reduced information words and the modified code vectors, since again, this is advantageous from a processing point-of-view.

According to another preferred embodiment of this aspect of the invention, certain pieces of information are propagated in connection with completing the processing of a current data word and initiating the processing of a subsequent data word. Preferably, this propagated information includes: a pointer which indicates a first sample value of the following data word, a group of parameters that describe the relevant set of carrier frequency-phase candidate vectors, the relevant set of code vectors, and the prompt-, early-, and late pointers. Hence, based on the propagated information, the subsequent data word may be processed immediately.

According to a further aspect of the invention the object is achieved by a computer program directly loadable into the internal memory of a computer, comprising software for performing the above proposed method when said program is run on a computer.

According to another aspect of the invention the object is achieved by a computer readable medium, having a program recorded thereon, where the program is to make a computer perform the above proposed method.

According to another aspect of the invention the object is achieved by the signal receiver as initially described, which is characterized in that the proposed computer program is loaded into the memory means, such that the receiver will operate according to the above-described method.

Consequently, the invention offers an excellent instrument for receiving and decoding any type of spread spectrum signals in a general software radio receiver. For instance, one and the same receiver may be used to track navigation satellite signals of different formats. These signals may even be received in parallel, such that a first signal is received on a first format while one or more other signals are received on a second or third format.

Moreover, the proposed solution permits one and the same receiver to be utilized for completely different purposes, such as communication in a cellular system.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

In order to realize a truly software based signal processing solution in real-time at high sampling rates, such as those required in a GNSS, the architecture of the microprocessor system must be utilized very efficiently. The present invention uses an approach, which involves a form of parallel processing based on pre-generated code vector representations. The invention thereby strikes a balance between processing speed and memory usage, which compensates for the capacity deficit of a general purpose microprocessor in relation to an ASIC. The details of this solution will become apparent from the below disclosure.

Figure 1:
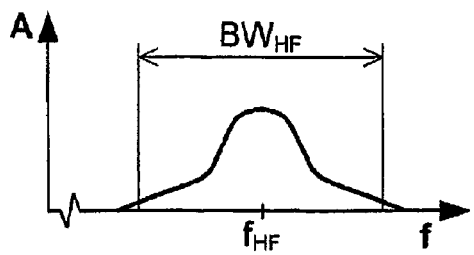
FIG. 1 shows a spectrum graph over an exemplary spread spectrum signal from which information may be extracted according to the invention.

FIG. 1 shows a spectrum graph over an exemplary spread spectrum signal from which information may be extracted according to the invention. For example, the signal may be a GPS C/A-signal in the L1-band with a carrier frequency $f_{HF}$ of 1.57542 GHz. This means that the signal's spectrum is symmetrical around the carrier frequency $f_{HF}$. Moreover, the signal has at least 98% of its energy distributed within a 2 MHz wide frequency band $BW_{HF}$ around the carrier frequency $f_{HF}$. Therefore, it is generally sufficient if the spread spectrum signal is downconverted to an intermediate frequency $f_{IF}$ at around 1 MHz in order to enable further signal processing at a lower frequency.

Figure 2:
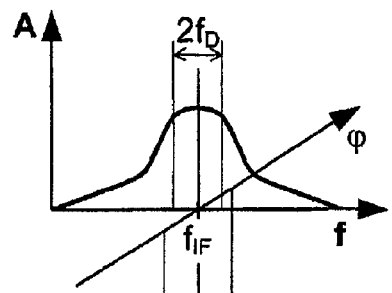
FIG. 2 shows a spectrum graph over a frequency down-converted signal corresponding to the spectrum shown in FIG. 1.

FIG. 2 shows a spectrum graph over such a frequency down-converted signal, whose spectrum is symmetrical around an intermediate frequency $f_{IF}$, which is considerably lower than the carrier frequency $f_{HF}$, for example $f_{IF}$=1.25 MHz. Due to movements of the transmitter (i.e. typically a satellite in orbit) and the receiver (i.e. typically a mobile GNSS-receiver) a Doppler shift may occur in the received signal, which is proportional to the relative velocity between the transmitter and the receiver. A maximum Doppler shift $f_D$ is defined which in the GNSS case normally is approximately 10 kHz. Thus, the entire spectrum may be shifted within an interval $2f_D$, such that the center frequency falls any where between $f_{IF}+f_D$ (corresponding to a maximum positive Doppler shift) and $f_{IF}-f_D$ (corresponding to a maximum negative Doppler shift). For illustrative purposes the interval $2f_D$, has been severely exaggerated in the FIG. 2. The figure also indicates a phase variation interval $\phi_D$ (along an independent axis $\phi$) around the intermediate frequency $f_{IF}$. The phase variation interval $\phi_D$ demonstrates the fact that the phase position of the received signal is initially unknown to the receiver, and thus constitutes a calibration parameter. The effects of this parameter will be further elucidated below with reference to FIG. 5.

Figure 3:
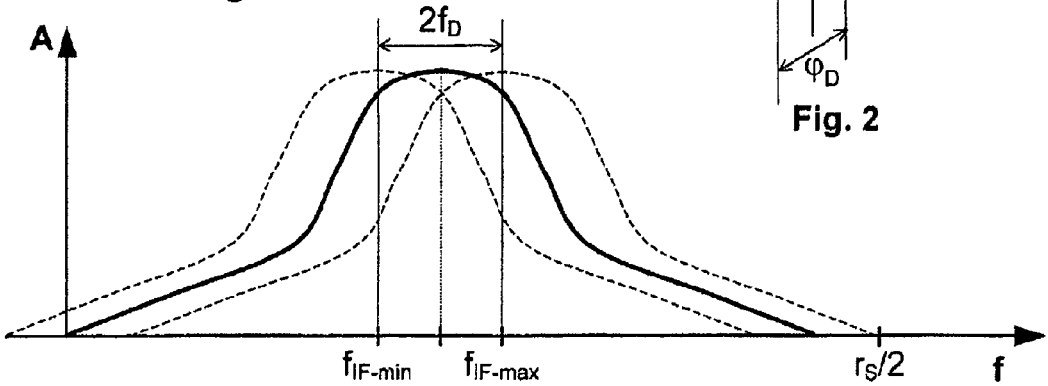
FIG. 3 is an enlarged version of FIG. 2 in which a Doppler shifting of the spectrum is illustrated.

An enlarged version of the spectrum in FIG. 2 is shown in FIG. 3. The intermediate spectrum may, due to possible Doppler effects, be shifted such that its center frequency lies in the interval $2f_D$ from $f_{IF-min}=f_{IF}-f_D$ to $f_{IF-max}=f_{IF}+f_D$. The potential maximum shifted spectra are here indicated with a respective dashed line. The diagram in FIG. 3 also shows a Nyquist frequency $r_s/2$ corresponding to a minimal sampling rate $r_s$ which, when used for sampling the intermediate frequency signal, will result in a non-aliased discrete spectrum. Provided that $f_D$=10 kHz, $f_{IF}$=1.25 MHz, $BW_{HF}$=2 MHz and the intermediate frequency signal is lowpass filtered through an analog filter having a 2.5 MHz wide passband, the minimal sampling rate $r_s$ becomes 5 MHz (i.e. two times the highest frequency component after the analog filter).

Figure 4:
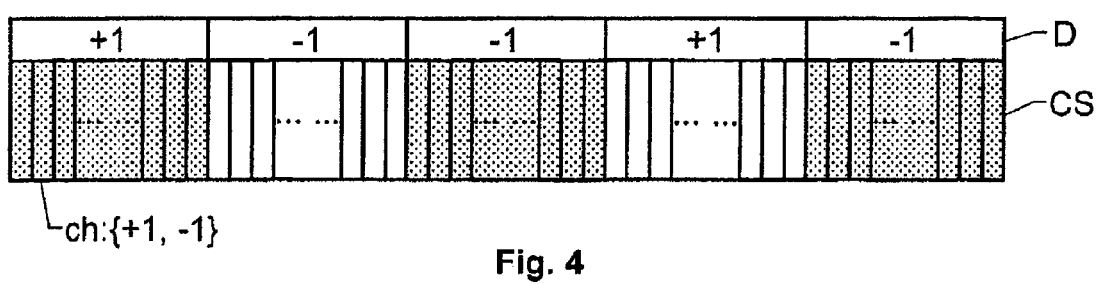
FIG. 4 illustrates how a data signal is modulated onto a signal source specific code sequence according to an embodiment of the invention.

FIG. 4 illustrates schematically how a data signal D is modulated onto a signal source specific code sequence CS on the transmitter side according to an embodiment of the invention. According to a preferred embodiment of the invention, the signal source specific code sequence CS constitutes so-called pseudo random noise. The data signal D here contains a data symbol sequence [+1, −1, −1, +1, −1], and has a relatively low symbol rate, say 50 Hz. The signal source specific code sequence CS, however, has a relatively high symbol rate (or more correctly chipping rate). For instance, a signal source specific code sequence CS in the form of a GPS C/A code may have a chipping rate of 1.023 MHz and contain 1023 chips per period. Each chip, ch, is either +1 or −1. Hence, the C/A code repeats itself one per ms. The data signal D is modulated onto (or spread by) the signal source specific code sequence CS by multiplying each data symbol with the code sequence CS. The data symbol +1 thereby results in an unaltered code sequence CS, whereas the data symbol −1 results in an inverted code sequence CS.

If a data signal D having a rate of 50 Hz is spread by means of a signal source specific code sequence CS having a chipping rate of 1.023 MHz, this results in 20 entire code sequences CS per data symbol. Namely, the period time for one data symbol is 20 ms, whereas the period time for the code sequence is only 1 ms.

Figure 5:
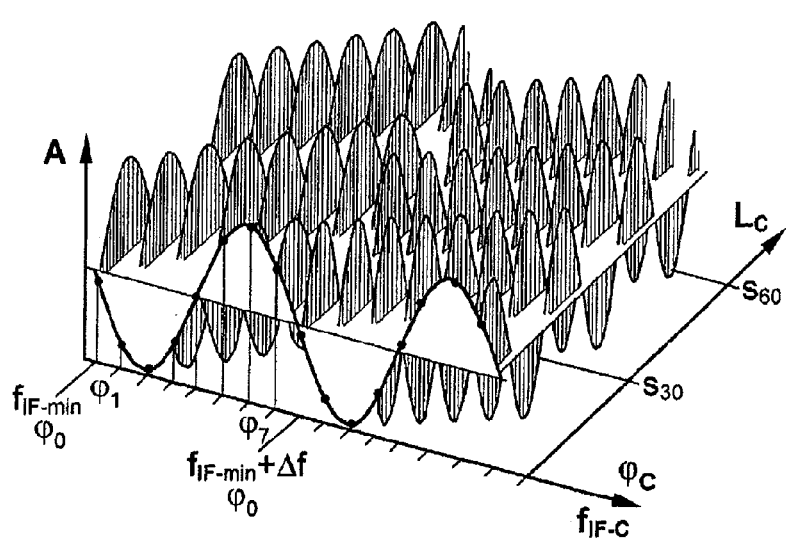
FIG. 5 depicts a three-dimensional graph over carrier frequency-phase candidate vectors to be used as initial correlators according to an embodiment of the invention.

FIG. 5 depicts a three-dimensional graph over different carrier frequency-phase candidate vectors. As mentioned above, the intermediate frequency spectrum may be Doppler shifted. Therefore, the particular frequency of the received signal is initially unknown within a Doppler frequency interval from $f_{IF-min}$ to $f_{IF-max}$. Moreover, the phase position of the received signal is beforehand unknown to the receiver. In order to enable an estimation of the actual intermediate carrier frequency, the Doppler frequency interval $f_{IF-min}$–$f_{IF-max}$ is divided into an integer number of equidistant frequency steps. Of course, the larger the number of steps is, the more accurately the intermediate carrier frequency may be estimated. In this example, a step size $\Delta f$ of 20 Hz is chosen. In some applications, however, a much larger step size $\Delta f$ may provide a sufficient frequency accuracy, whereas in other applications (where relatively high accuracy is needed) a considerably smaller step size $\Delta f$ may be required. In any case, a Doppler frequency interval $f_{IF-min}$–$f_{IF-max}$ of 20 kHz and a step size $\Delta f$ of 20 Hz requires 1000 steps, where a first step includes the frequencies from $f_{IF-min}$ to $f_{IF-min}+\Delta f$, a second step includes the frequencies from $f_{IF-min}+\Delta f$ to $f_{IF-min}+2\Delta f$, and so on up to a last step including the frequencies from $f_{IF-min}+999\Delta f$ to $f_{IF-max}$.

A frequency candidate vector $f_{IF-C}$ is defined for each frequency step. In order to estimate an initial phase position of the intermediate carrier frequency, an integer number of initial phase positions $\phi_0, \ldots, \phi_7$ are determined. The illustrated example shows eight such positions $\phi_C$. This gives a phase resolution of $\pi/4$. For each frequency candidate vector $f_{IF-C}$, eight different phase positions $\phi_0, \ldots, \phi_7$ are thus defined which each represents a particular phase shift from 0 to $7\pi/4$. A combination of a certain carrier frequency candidate vector $f_{IF-C}$ and a particular initial phase position $\phi_C$ is referred to as a carrier frequency-phase candidate vector. FIG. 5 shows all such vectors (i.e. eight) for the first step, where $f_{IF-C}=f_{IF-min}$, and the second step, where $f_{IF-C}=f_{IF-min}+\Delta f$.

Additionally, FIG. 5 includes an axis $L_C$ along which the number of sample values (or length) of the frequency candidate vector $f_{IF-C}$ is indicated. The $L_C$ number is preferably a power of 2 because this generally renders the implementation more simple. The number of sample values in each frequency candidate vector $f_{IF-C}$ is set in consideration of the available memory space, the desired frequency resolution and the desired phase resolution. If, in the example above, a length of 512 samples is chosen and each sample requires one byte, the total (uncompressed) memory demand would be 3.9 MB (i.e. 1000 frequencies×8 phase positions×512 B=4096000 B=3.9 MB).

Figure 6:
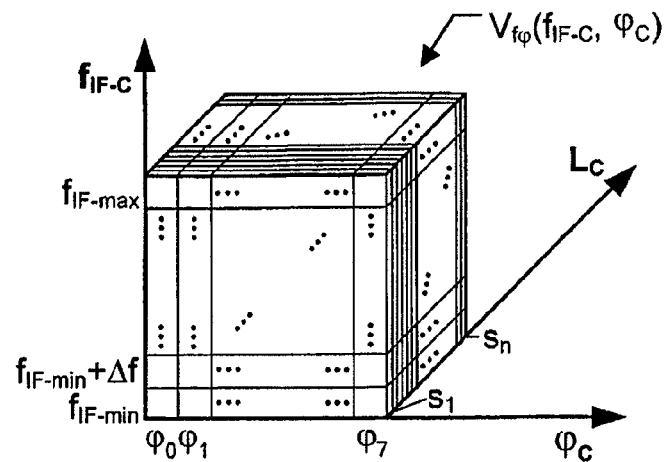
FIG. 6 shows an alternative representation the carrier frequency-phase candidate vectors in FIG. 5, FIGS. 7-8 show graphs which illustrate how a code index and a code phase are defined for a received signal according to an embodiment of the invention, FIGS. 9a,b illustrate how a modified code vector is generated based on an original code vector according to an embodiment of the invention.

FIG. 6 shows an alternative representation the carrier frequency-phase candidate vectors $V_{f\phi}(f_{IF-C}, \phi_C)$ in FIG. 5. Here, the vectors $V_{f\phi}(f_{IF-C}, \phi_C)$ range from the carrier frequency $f_{IF-C}=f_{IF-min}$ (say 1.24 MHz) to $f_{IF-C}=f_{IF-max}$ (say 1.26 MHz), from the phase shift position $\phi_C=\phi_0$ (say 0) to $\phi_C=\phi_7$ (say $7\pi/4$), all have a length $L_C$ of $s_n$ samples (say 512) and are represented in a cube. Hence, a particular frequency-phase candidate vector $V_{f\phi}(f_{IF-C}, \phi_C)$ is given by a cuboid segment in the cube which is parallel with the $L_C$-axis, and ranges from $L_C=s_1$ to $L_C=s_n$.

After having generated all the carrier frequency-phase candidate vectors $V_{f\phi}(f_{IF-C}, \phi_C)$, the vectors are stored in a digital memory with a comparatively short access time, such that they may be readily accessed during a later acquisition and/or tracking phase. Preferably, the carrier frequency-phase candidate vectors $V_{f\phi}(f_{IF-C}, \phi_C)$ are stored according to a data format which is adapted to performing multiplication operations between incoming data words (representing one or more received signals) and segments of carrier frequency-phase candidate vectors $V_{f\phi}(f_{IF-C}, \phi_C)$. The vectors may either include packed samples or they may contain samples that are unpacked to a smallest manageable unit in the microprocessor, such as a byte. Further details regarding the data format issues will be discussed below.

Figure 7:
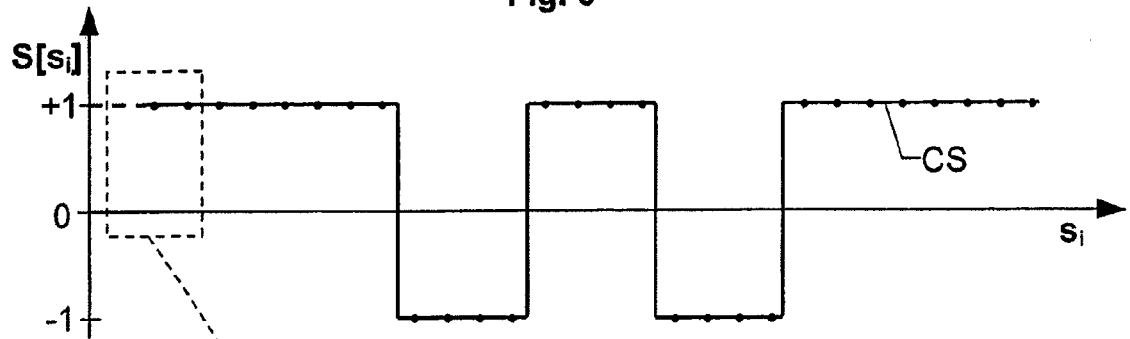

FIG. 7 shows a graph over an exemplary code sequence CS, which has been received, downconverted and sampled according to an embodiment of the invention. After subsequent removal of the intermediate frequency component, the code sequence CS either attains the signal value +1 or −1, and the symbols are altered at a chipping rate of for example 1.023 MHz. At the receiver side, the code sequence CS is sampled with a sampling rate $r_s$ of for example 5 MHz. The sampling instances are indicated by means of dots on the code sequence signal CS along an axis $s_i$. As is apparent from the figure there are approximately four sample values per chip period. Hence, the requirements of the Nyquist theorem are clearly fulfilled. However, the samples are not capable of determining the transition instances with a sufficient accuracy, i.e. where the code sequence signal CS changes from representing one chip symbol to representing another one chip symbol. Therefore, a so-called code phase must be determined. Moreover, a particular sample value at which the code sequence starts must also be established.

Figure 8:
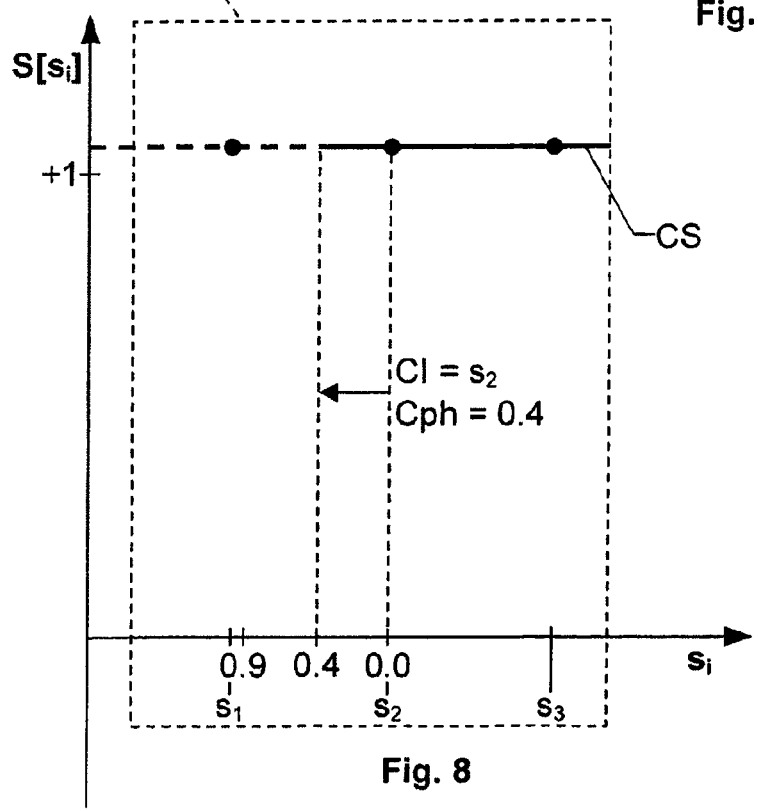

FIG. 8 shows a graph, which illustrates the sample value at which the code sequence CS starts (the so-called code index CI) and how a code phase, Cph, is defined in relation to this sample value. An initial segment of the code sequence signal. CS in FIG. 7 is therefore represented in FIG. 8.

A first sample instance is here presumed to occur shortly prior to the actual start of the code sequence CS signal period. Hence, a corresponding sample value $s_1$ belongs to the end of the preceding period. This is illustrated by means of the line representing the code sequence signal CS being dashed. A subsequent sample instance, however, overlaps the code sequence CS period. The corresponding sample value $s_2$ is defined as the code index CI. The actual beginning of a code sequence signal is determined in a preceding acquisition phase and typically involves correlation between the received signal and a local copy of the code sequence CS.

The distance between the start of the code sequence signal CS and the code index CI, in turn, is defined as the code phase Cph, and thus represents a measure of the translation (or skew) between the sample instances $s_i$ and the chip transitions. The sampling interval between two consecutive sample instances $s_i$ is divided into an integer number of possible initial code phase positions in order to estimate the code phase Cph. In this example, ten 0.1-steps ranging from 0.0 to 0.9 are defined, where a first step 0.0 would indicate that code sequence signal CS starts at the code index CI, and a last step 0.9 would indicate that code sequence signal CS starts almost at the preceding sample value $s_1$. The FIG. 8 shows a code phase Cph of 0.4, i.e. a situation where the code sequence signal CS starts approximately in the middle between two consecutive sample instances $s_i$.

In analogy with the carrier frequency-phase candidate vectors $V_{f\phi}(f_{IF-C}, \phi_C)$, code rate-phase candidate vectors may now be defined for each signal source specific code sequence CS and combination of code rate CR, code index CI and code phase Cph. Nevertheless, according to a preferred embodiment of the invention, a modified code vector is first produced based on each original code vector.

Figure 9A:
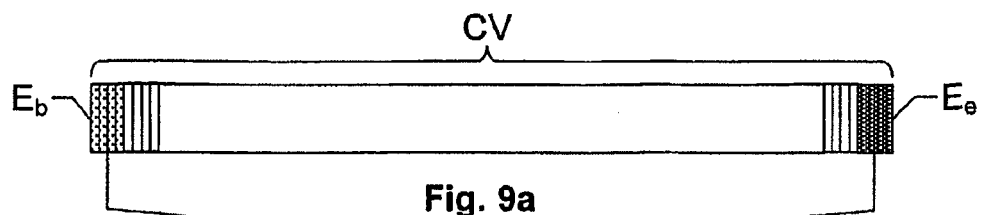
Figure 9B:
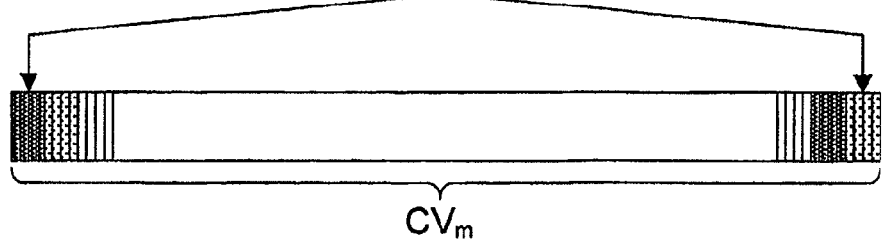

FIGS. 9a and 9b illustrate how this may be performed. A code vector CV in FIG. 9a contains a number of sample values, say 5000. Preferably, the number of sample values is selected in relation to sampling rate such that a full code sequence period is recorded. In the above example, with a sampling rate $r_s$ of 5 MHz, this means that the 5000 samples cover exactly one full code sequence CS period (which has a duration of 1 ms and contains 1023 chips, since the chipping rate is 1.023 MHz).

A modified code vector $CV_m$ is now generated on basis of the original code vector CV by copying a particular number of elements $E_e$ (e.g. two) from the end of the original code vector CV to the beginning of the modified code vector $CV_m$. Correspondingly, a particular number of elements $E_b$ (e.g. two) from the beginning of the original code vector CV are copied to the end of the code vector $CV_m$, i.e. after the elements $E_e$. FIG. 9b shows the resulting modified code vector $CV_m$. Since, in this example, each chip symbol is sampled at approximately four instances, two sample values are equivalent to about one half chip period. Thereby, the above copying of the elements $E_e$ and $E_b$ allows a one-half-chip shifting of the code vector CV during a correlation operation between the code vector CV and the received data. This will be discussed further below with reference to FIG. 11.

Figure 10:
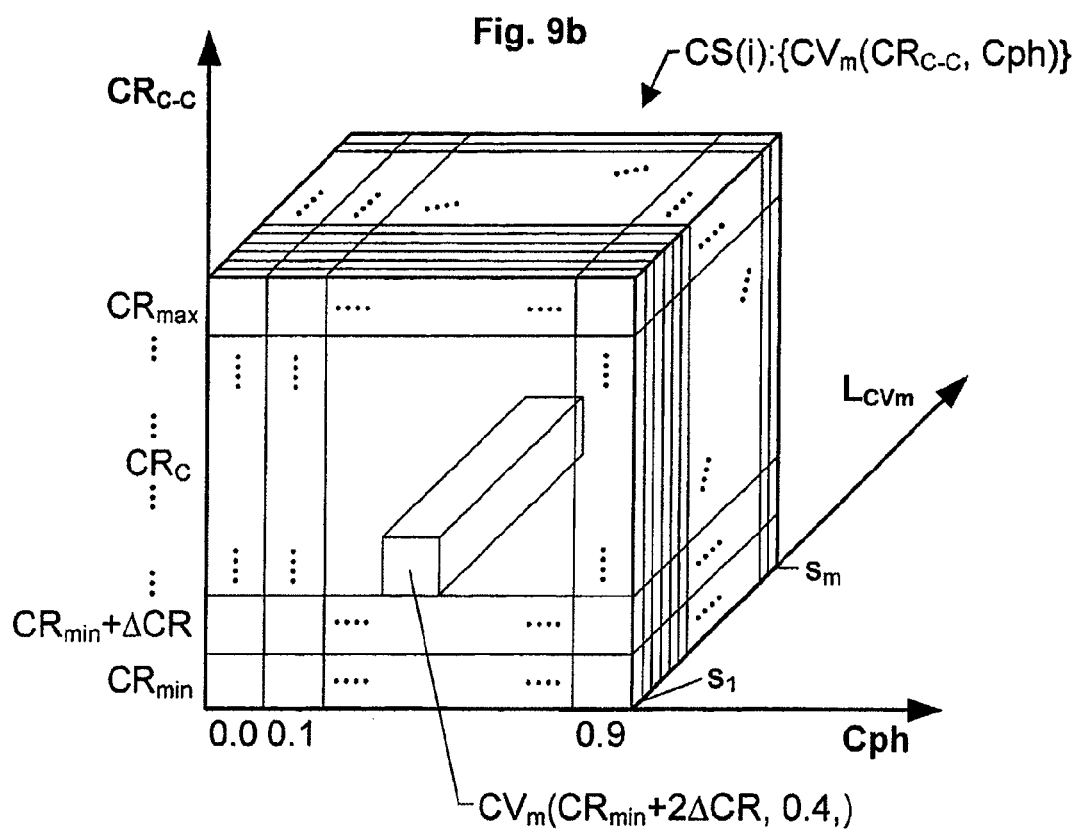
FIG. 10 depicts a three-dimensional graph over code rate-phase candidate vectors to be used as subsequent correlators according to an embodiment of the invention.

FIG. 10 depicts a three-dimensional graph over different code rate-phase candidate vectors $CV_m(CR_{C-C}, Cph)$ which represent a signal source specific code sequence CS(i). Analogous to the intermediate carrier frequency, the nominal code rate $CR_C$ for the code rate candidate vector $CR_{C-C}$ may also vary due to Doppler effects from a lowest value $CR_{min}$ to a highest value $CR_{max}$. However, since the code rate (or chipping rate) is comparatively high, the rate variation here becomes rather small.

For example, a Doppler shift of 10 kHz at the intermediate carrier frequency is equivalent to a shift in a nominal code rate $CR_C$ at 1.023 MHz of merely 6.5 Hz. Namely, the Doppler shift in respect of the code rate is generally equal to the ratio between the carrier frequency and the code rate (1575.42 MHz/1.023 MHz=1540; a Doppler shift of 10 kHz at the intermediate carrier frequency thus corresponds to 10000/1540≈6.5 Hz). The code rate candidate vector $CR_{C-C}$ may attain a value anywhere in a Doppler rate interval between $CR_{min}$=1022993.5 Hz and $CR_{max}$=102306.5 Hz. The Doppler rate interval $CR_{min}$–$CR_{max}$ is divided into an integer number of equidistant code rate steps $\Delta CR$, say 13. In this example, each interval $CR_{min}$, $CR_{min}+\Delta CR$, ..., $CR_{max}$ thus spans 1 Hz. According to a preferred embodiment of the invention, the code rate step size is adaptive, e.g. determined on basis of the sampling frequency and the desired resolution.

In FIG. 10, the three-dimensional graph (or cube) contains a set of code rate-phase candidate vectors $CV_m(CR_{C-C}, Cph)$, where the code rate ranges from $CR_{C-C}=CR_{min}$ to $CR_{C-C}=CR_{max}$, the code phase ranges from Cph=0.0 to Cph=0.9, and each vector has a length $L_{CVm}$ of $s_m$ samples (for example 5004). Hence, a particular code rate-phase candidate vector $CV_m(CR_{C-C}, Cph)$ is given by a cuboid segment $CV_m(CR_{min}+2\Delta CR, 0.4)$ which is parallel with the $L_{CVm}$-axis and ranges from $L_{CVm}=s_1$ to $L_{CVm}=s_m$.

After having generated all the code rate-phase candidate vectors $CV_m(CR_{C-C}, Cph)$, these vectors are stored in a digital memory with a comparatively short access time, such that they may be readily accessed during the acquisition and/or tracking phase. Preferably, the code rate-phase candidate vectors $CV_m(CR_{C-C}, Cph)$ are stored according to a data format which is adapted to correlation operations to be performed between a vector that has been derived from incoming data words and a segment of a the code rate-phase candidate vectors $CV_m(CR_{C-C}, Cph)$. For example, the code rate-phase candidate vectors $CV_m(CR_{C-C}, Cph)$ may include packed samples or they may contain samples that are unpacked to a smallest manageable unit in the microprocessor, such as a byte. Further details regarding these data format issues will be discussed below with reference to FIG. 13.

During tracking of a spread spectrum signal, i.e. a continued reception of the signal and demodulation of the data contained therein, it is necessary to update relevant tracking parameters for the signal. Normally, the tracking phase is preceded by a so-called acquisition phase during which a set of preliminary parameters are established that are required for initiating the signal decoding. A successful acquisition phase thus results in that at least one signal source specific code sequence is identified and a data signal transmitted by means of this sequence is possible to demodulate. The tracking characteristics that may be associated with a signal source specific code sequence include: a modified code vector $CV_m$ (which defines a carrier frequency candidate vector $f_{IF-C}$ and an initial phase position $\phi_C$), a code phase position, Cph, and a code index, CI. In order to maintain an adequate timing of the correlating operations in the receiver, a set of pointers are required which indicate the start position of the code sequence in relation to the modified code vector and are updated repeatedly, preferably between each correlation.

Figure 11:
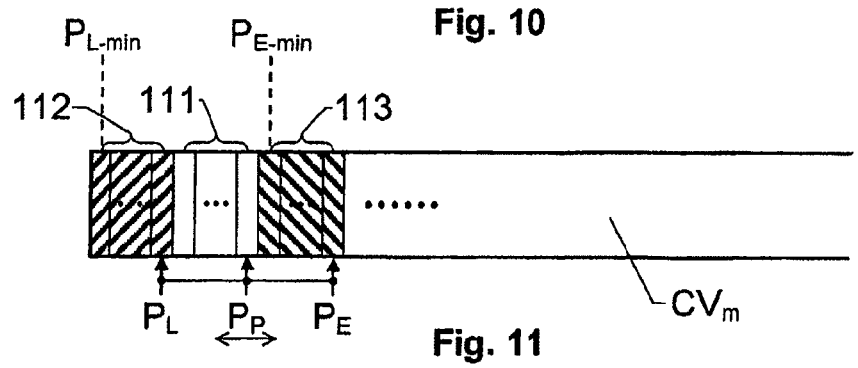
FIG. 11 illustrates how a set of code sequence start pointers is assigned to a modified code vector according to an embodiment of the invention.

FIG. 11 illustrates one such set of pointers that are assigned to a modified code vector $CV_m$. A prompt pointer $P_P$ indicates a current estimate of the code sequence start position. This pointer, $P_P$ is initially set equal to the code index CI. Adequate $P_P$-pointer positions for any subsequent segments of the received data are obtained by retrieving appropriate modified code vectors $CV_m$ from the digital memory where such pre-generated are stored. Between each segment, the code rate candidate vector $CR_{C-C}$ as well as the initial code phase Cph is updated. Additionally, at least one pair of early- and late pointers $P_E$ and $P_L$ respectively is assigned on each side of the prompt pointer $P_P$, where the early pointer $P_E$ specifies a sample value being positioned at least one element before the prompt pointer's $P_P$ position, and the late pointer $P_L$ specifies a sample value being positioned at least one element after the prompt pointer's $P_P$ position. Each correlation is then performed with the presumption that the code sequence starts at the $P_P$-position, at the $P_E$-position as well as at the $P_L$-position. If the correlation over the $P_P$-position results in a higher correlation value than over any of the other positions, and at the same time the $P_E$- and $P_L$-pointers are balanced (i.e. the correlation over these positions result in equal values), this is interpreted as an optimal setting of the tracking parameters. Should, however, this not be true the sampled data must be repositioned in relation to the $P_P$-, $P_E$- and $P_L$-pointers, such that the correlation peak again coincides with the $P_P$-pointer's position. An un-calibrated pointer positioning may thus be detected via a difference between the correlation value over the $P_E$-pointer position and the correlation value over the $P_L$-pointer position, while the correlation over the $P_P$-position still results in the highest correlation value. In this case, the potentially highest correlation value (corresponding to the optimal $P_P$-positioning) lies somewhere between the current $P_P$-position and the current $P_E$-position or between the current $P_P$-position and the current $P_L$-position depending on which of the $P_E$- and $P_L$-pointer positions that results in the highest correlation value. A pointer updating normally takes place between each segment. A second or third pair of $P_E$- and $P_L$-pointers outside the first pair of pointers further enhances the possibilities of accomplishing an accurate adjustment of the tracking. Depending on the value of the received symbol, an optimal setting $P_P$-pointer may, in fact, also be equivalent to the correlation over the $P_P$-position resulting in a lower correlation value than over any of the other pointer positions. Namely, this is true if a negative valued data bit is received. However otherwise, the same principles apply.

In any case, the $P_P$-, $P_E$- and $P_L$-pointers may only be positioned within certain intervals in the modified code vector $CV_m$. The $P_P$-pointer may be set anywhere within a first interval 111, the $P_E$-pointer within a second interval 112 and the $P_L$-pointer within a third interval 113. All the pointers are always set together, such that their relative distances remain unchanged. A limit value $P_{L\text{-}min}$ for the $P_L$-pointer typically coincides with the first element of the modified code vector $CV_m$. Namely, outside this range a meaningful correlation cannot be performed. As a consequence of this and the fact that the pointers are set jointly $P_P$-, $P_E$- and $P_L$, a corresponding limit value $P_E$-min for the $P_E$-pointer is also defined.

Figure 12:
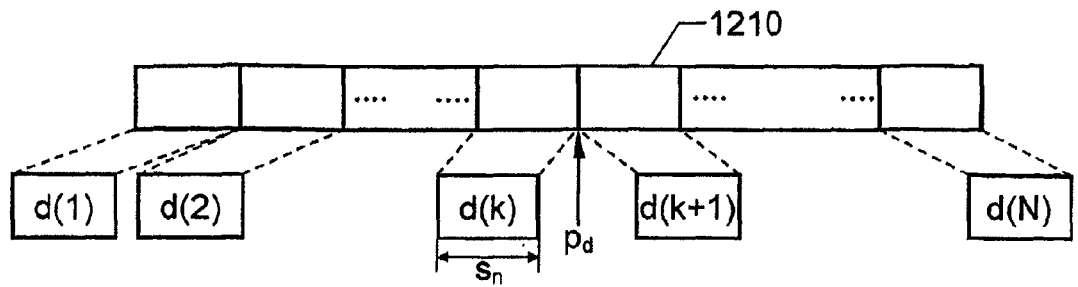
FIG. 12 illustrates how data words are formed from a sequence of incoming level-discrete sample values according to an embodiment of the invention.

FIG. 12 illustrates how data words $d(1), d(2), \ldots, d(N)$ are formed from a sequence 1210 of incoming level-discrete sample values according to an embodiment of the invention. The data words $d(1), \ldots, d(N)$ are formed such that each data word $d(k)$ contains a number of elements which is equal to the number of elements $s_n$ in each carrier frequency-phase candidate vector. For instance, the length of these vectors may be 512 sample values (as in the example described above with reference to the FIGS. 5 and 6). Given that each sequence 1210 contains 5000 sample values, the number N of data words becomes 10 (5000/512≈9.76 means that the last quarter of the tenth data word $d(10)$ is empty). According to the invention, the elements in a current data word $d(k)$ are processed jointly (i.e. in parallel). Then, the processing of a subsequent data word $d(k+1)$ is initiated, and any processing parameters obtained during the processing of the current data word $d(k)$ that are required when processing the subsequent data word $d(k+1)$ are propagated as input data to the processing of the latter. These processing parameters preferably include: a pointer $P_d$ which indicates a first sample value of the subsequent data word $d(k+1)$, a group of parameters which describe the relevant set of carrier frequency-phase candidate vectors $V_{f\phi0}(f_{IF\text{-}C}, \phi_C)$ (i.e. a carrier frequency candidate vector $f_{IF\text{-}C}$ representing an in-phase version and a carrier frequency candidate vector $f_{IF\text{-}C}$ representing a quadrature-phase version), the relevant set of code vectors $CV_m$, and prompt-, early-, and late pointers $P_P$, $P_E$, and $P_L$ respectively.

Figure 13:
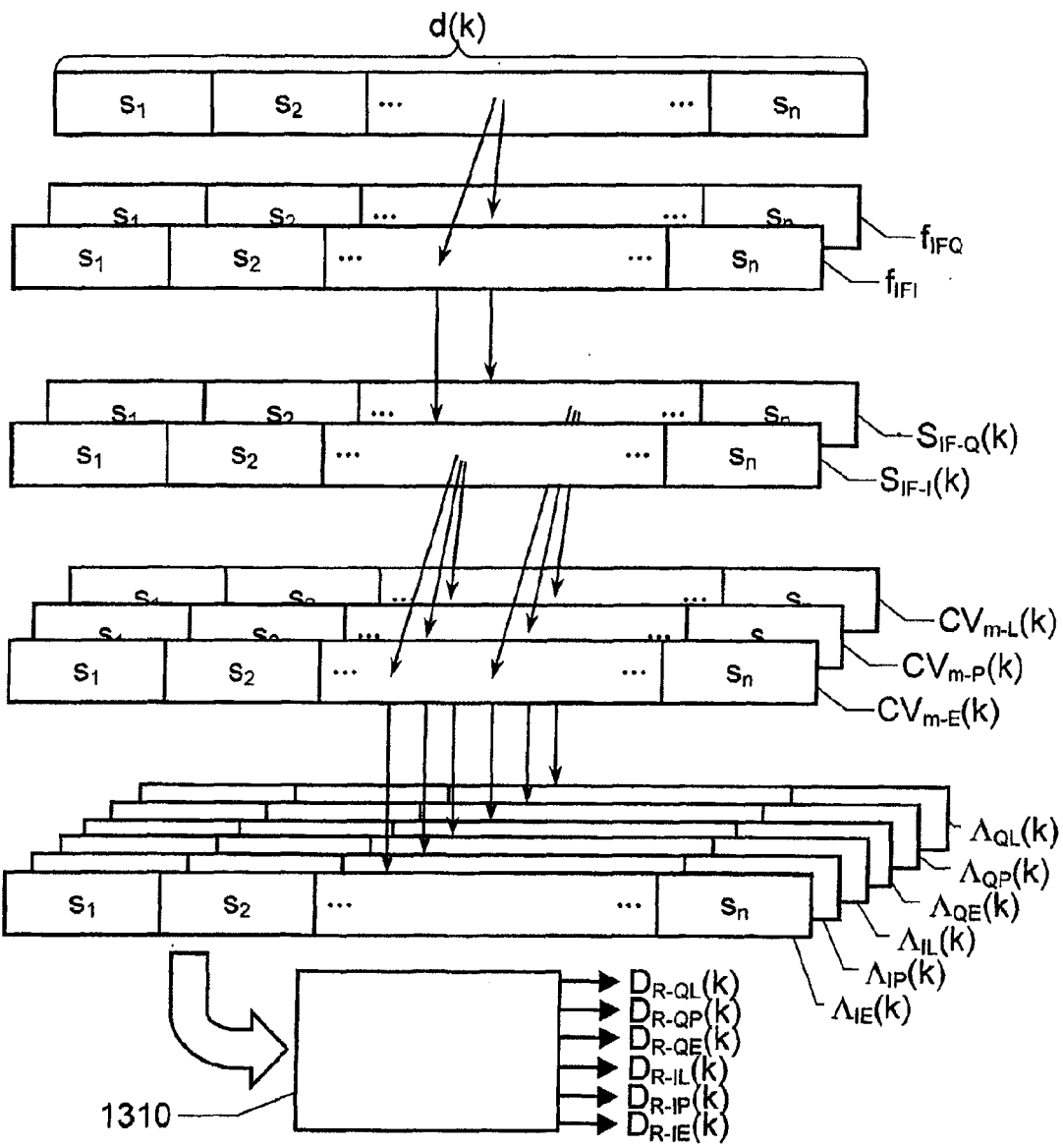
FIG. 13 illustrates how the data words of FIG. 12 are correlated with various pre-generated vectors according to an embodiment of the invention.

FIG. 13 illustrates how the data words of FIG. 12 are correlated with various pre-generated vectors according to an embodiment of the invention. First, a relevant set of carrier frequency-phase candidate vectors $V_{f\phi}(f_{IF\text{-}C}, \phi_C)$ is calculated for the data word $d(k)$. This set is normally obtained in a preceding acquisition phase (or, if the data word $d(k)$ is not the first word to be processed, during the processing of a previous word).

Thereafter, for each carrier frequency-phase candidate vector $V_{f\phi}(f_{IF\text{-}C}, \phi_C)$ in the relevant set, a pre-generated in-phase representation $f_{IFI}$ and a quadrature-phase representation $f_{IFQ}$ of the vector ($V_{f\phi}(f_{IF\text{-}C}, \phi_C)$) respectively is acquired. Both these representations are found in the digital memory where the pre-generated carrier frequency-phase candidate vectors $V_{f\phi}(f_{IF\text{-}C}, \phi_C)$ are stored because they are merely one quarter period delays of one and the same vector, and the memory holds initial phase position representations for an entire period, see FIG. 6.

Then, in order to eliminate the influence of the carrier frequency component, the data word $d(k)$ is multiplied with the in-phase representation $f_{IFI}$ of the carrier frequency-phase candidate vector $V_{f\phi}(f_{IF\text{-}C}, \phi_C)$ in the relevant set. As a result thereof, a first intermediate-frequency-reduced information word $S_{IF\text{-}I}(k)$ is produced. Correspondingly, the data word $d(k)$ is also multiplied with the quadrature-phase representation $f_{IFQ}$ of the carrier frequency-phase candidate vector $V_{f\phi}(f_{IF\text{-}C}, \phi_C)$ in the relevant set, and a second intermediate-frequency-reduced information word $S_{IF\text{-}Q}(k)$ is produced.

Preferably, the multiplication between the data word $d(k)$ and the in-phase representation $f_{IFI}$ respective the quadrature-phase representation $f_{IFQ}$ of the carrier frequency-phase candidate vector $V_{f\phi}(f_{IF\text{-}C}, \phi_C)$ are performed by means of XOR- or SIMD-operations (i.e. 1-bit and multiple-bits multiplications respectively). This is namely possible if the data word $d(k)$ and the vector $V_{f\phi}(f_{IF\text{-}C}, \phi_C)$ have compatible data formats.

Subsequently, the first intermediate-frequency-reduced information word $S_{IF\text{-}I}(k)$ is multiplied with a modified code vector $CV_{m\text{-}P}$, which has been retrieved from the digital memory where these pre-generated vectors are stored, and starts at a position indicated by the prompt pointer $P_P$. A first prompt-despread symbol string $\Lambda_{IP}(k)$ is produced as a result of this operation. The first intermediate-frequency-reduced information word $S_{IF\text{-}I}(k)$ is also multiplied with a modified code vector $CV_{m\text{-}E}(k)$, which starts at a position indicated by the early pointer $P_E$. A first early-despread symbol string $\Lambda_{IE}(k)$ is produced as a result of this operation. The first intermediate-frequency-reduced information word $S_{IF\text{-}I}(k)$ is likewise multiplied with a modified code vector $CV_{m\text{-}L}(k)$, which starts at a position indicated by the late pointer $P_L$, and a first late-despread symbol string $\Lambda_{IL}(k)$ is produced. Moreover, the second intermediate-frequency-reduced information word $S_{IF\text{-}Q}(k)$ is multiplied with a modified code vector $CV_{m\text{-}P}(k)$, which starts at a position indicated by the prompt pointer $P_P$, and a second prompt-despread symbol string $\Lambda_{QP}(k)$ is produced. Correspondingly, the second intermediate-frequency-reduced information word $S_{IF\text{-}Q}(k)$ is multiplied with a modified code vector $CV_{m\text{-}E}(k)$, which starts at a position indicated by the early pointer $P_E$, and a second early-despread symbol string $\Lambda_{QE}(k)$ is produced. Likewise, the second intermediate-frequency-reduced information word $S_{IF\text{-}Q}(k)$ is multiplied with a modified code vector $CV_{m\text{-}L}(k)$, which starts at a position indicated by the late pointer $P_L$, and a second late-despread symbol string $\Lambda_{QL}(k)$ is produced.

After that, a resulting data word $D_{R\text{-}IE}(k)$, $D_{R\text{-}IP}(k)$, $D_{R\text{-}IL}(k)$, $D_{R\text{-}QE}(k)$, $D_{R\text{-}QP}(k)$ and $D_{R\text{-}QL}(k)$ may be derived from the each of the despread symbol strings $\Lambda_{IP}(k)$, $\Lambda_{IE}(k)$, $\Lambda_{IL}(k)$, $\Lambda_{QP}(k)$, $\Lambda_{QE}(k)$ and $\Lambda_{QL}(k)$ respectively by adding the elements in the respective string together. If the strings represent un-packed data, the processor may simply perform the relevant adding operation to obtain the resulting data word $D_R(k)$. If however, the strings represent packed data, the resulting data word $D_R(k)$ is, according to a preferred embodiment of the invention, derived by looking up a pre-generated value in a table 1310 based on the bit pattern given by the respective despread symbol string $\Lambda_{IP}(k)$, $\Lambda_{IE}(k)$, $\Lambda_{IL}(k)$, $\Lambda_{QP}(k)$, $\Lambda_{QE}(k)$ and $\Lambda_{QL}(k)$.

According to a preferred embodiment of the invention, in addition to the individual data words $D_{R-IE}(k)$, $D_{R-IP}(k)$, $D_{R-IL}(k)$, $D_{R-QE}(k)$, $D_{R-QP}(k)$ and $D_{R-QL}(k)$, corresponding accumulated data words are produced, such that after having generated a data word $D_R(k)$, the sum of all data words $D_R(1)$ to $D_R(k)$ is also obtained. Hence, when the data word $d(N)$ has been processed, the resulting sum $D_R(1)$ to $D_R(N)$ is also at hand.

Moreover, the resulting data words represent payload information. For instance, based on the set of resulting data words $D_{R-IE}(k)$, $D_{R-IP}(k)$, $D_{R-IL}(k)$, $D_{R-QE}(k)$, $D_{R-QP}(k)$ and $D_{R-QL}(k)$ a demodulated piece of information of a transmitted data symbol sequence D as shown in FIG. 4 may be derived. In a steady state operation, basically only one of the resulting data words, say $D_{R-IP}(k)$, actually carries the information.

According to a preferred embodiment of the invention, the multiplications involved in the multiplications between the intermediate-frequency-reduced information words $S_{IF-I}(k)$ and $S_{IF-Q}(k)$ respectively and the modified code vectors $CV_{m-P}(k)$, $CV_{m-E}(k)$; $CV_{m-L}(k)$ are all performed by means of XOR- or SIMD-operations. This is possible if the intermediate frequency information words $S_{IF-I}(k)$; $S_{IF-Q}(k)$ and the modified code vectors $CV_{m-E}(k)$, $CV_{m-P}(k)$; $CV_{m-L}(k)$ have compatible data formats.

Figure 14:
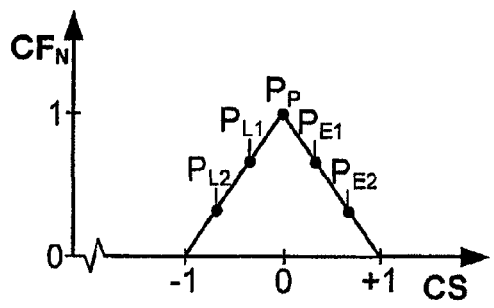
FIG. 14 illustrates how multiple pairs of pointers may be assigned according to an embodiment of the invention.

It was mentioned above with reference to FIG. 11 that more than one pair of early- and late pointers may be assigned to the prompt pointer in order to accomplish an improved tracking. FIG. 14 illustrates how two pairs of such pointers $P_{E1}$; $P_{L1}$ and $P_{E2}$; $P_{L2}$ respectively are assigned around a prompt pointer $P_P$ according to an embodiment of the invention. The horizontal axis here represents a code shift CS and the vertical axis shows a normalised correlation factor. An optimal positioning of the prompt pointer $P_P$ is thus equivalent to a normalised correlation value of 1. The more the sampled data is shifted in either direction from this position, the lower the correlation value becomes down to substantially zero for a shift of one chip or more. The algorithm is perfectly balanced when (as illustrated in the figure) both the pointers $P_{E1}$ and $P_{L1}$ of a first pair produce a first shifted correlation result, both the pointers $P_{E2}$ and $P_{L2}$ of a second pair produce a second shifted correlation result, the first shifted correlation result is larger than the second shifted correlation result and both the first and the second shifted correlation results are smaller than the correlation result obtained at the prompt position $P_P$. Said correlation results are preferably generated according to a process corresponding to what has been described above with reference to FIG. 13. Based on the correlation results for the pointer positions $P_P$, $P_{E1}$, $P_{L1}$, $P_{E2}$ and $P_{L2}$ a (if necessary new) set of modified code vectors $CV_{m-E}(k)$, $CV_{m-P}(k)$; $CV_{m-L}(k)$ is selected, which is deemed to be optimal.

Figure 15:
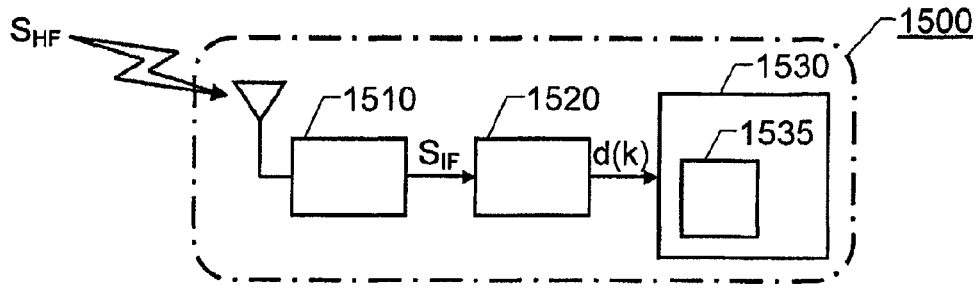
FIG. 15 shows a proposed signal receiver.

FIG. 15 shows a signal receiver 1500 for receiving navigation data signals transmitted in a navigation satellite system according to an embodiment of the invention. The receiver 1500 includes radio front end unit 1510, an interface unit 1520 and a digital processor unit 1530.

The radio front end unit 1510 is adapted to receive a continuous radio signal $S_{HF}$, and in response thereto down-convert to produce a corresponding intermediate frequency electrical signal $S_{IF}$ which has a comparatively high frequency. The interface unit 1520 is adapted to receive the electrical signal $S_{IF}$, and in response thereto, produce a sequence of sample values that represents the same information as the electrical signal $S_{IF}$ in digitized form and is divided into data words $d(k)$. The digital processor unit 1530 is adapted to receive the data words $d(k)$, and in response thereto, demodulate a data signal. The digital processor unit 1530, in turn, includes a memory means 1535, which is loaded with a computer program that is capable of controlling the steps of the correlation and accumulation procedures described herein when the program is run in the processor unit 1530.

Figure 16:
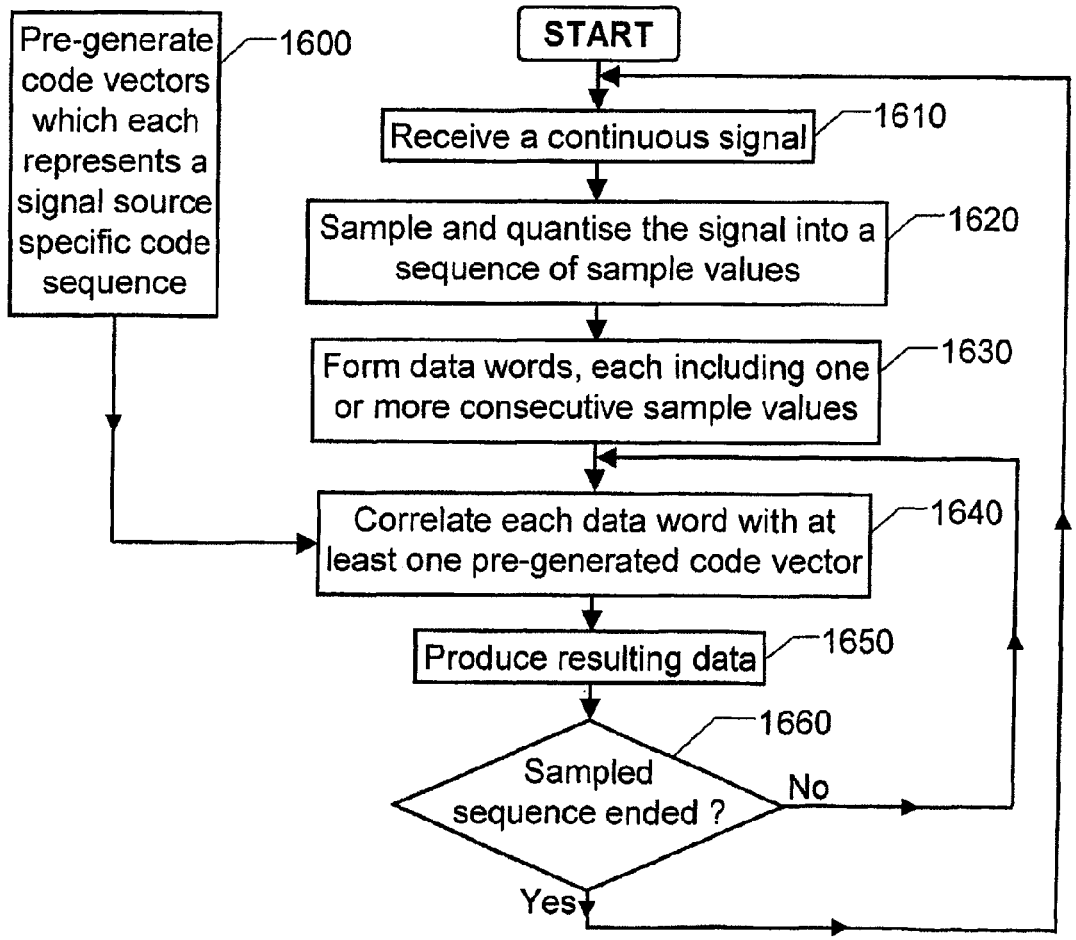
FIG. 16 illustrates, by means of a flow diagram, the general method of processing spread spectrum signals according to the invention.

In order to sum up, the general method of processing spread spectrum signals according to the invention will now be described with reference to a flow diagram in FIG. 16.

A preparation step 1600 pre-generates code vectors which each represents a signal source specific code sequence that is intended to be received (or at least possible to receive) and demodulated in the receiver. The step 1600 is performed before the signal reception is initiated.

A step 1610 then receives a continuous signal of a comparatively high frequency. A following step 1620 samples the continuous signal at a basic sampling rate, whereby a resulting sequence of time discrete signal samples is produced. Each sample is also quantised (either with a relatively low-resolution, such as with 1 bit per sample value, or with a relatively high resolution depending on the application and the number of data bits per samples delivered from the radio front end unit 1510), such that a corresponding level-discrete sample value is obtained. Subsequently, a step 1630 forms data words from the sample values, where each data word includes one or more consecutive sample values. After that, a step 1640 carries out correlation operations between the information in the data words and at least one of the pre-generated representations of a signal source specific code sequence. The correlation step involves correlating at least each vector in a sub-group of the code vectors with at least one vector that has been derived from a data word. A following step 1650 produces data as a result of the correlation performed in step 1640. Then, a step 1660 investigates whether the sampled sequence has ended, i.e. whether there are any more data words to process. If more sampled data to process is found, the procedure returns to the step 1640. Otherwise, the procedure loops back to the step 1610 again for continued reception of the incoming signal. Naturally, such signal is preferably also received during execution of the steps 1620 to 1660. The sequential procedure illustrated in FIG. 16 is merely applicable to a specific received signal segment. Preferably, all the steps are actually 1610 to 1660 are actually performed in parallel.

The process steps, as well as any sub-sequence of steps, described with reference to the FIG. 16 above may be controlled by means of a programmed computer apparatus, such as a microprocessor located in a GNSS-receiver. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

That which is claimed:

1. A software receiver comprising:
   a receiver capable of receiving a radio signal;
   means for digitizing the radio signal; and
   a software correlator capable of mixing the digitized radio signal to form a baseband signal using bit-wise parallelism.

2. The software receiver of claim 1 wherein said software correlator comprises:
   means for computing correlations between the baseband signal and at least one pseudo-random number (PRN) code using the bit-wise parallelism.

3. The software receiver of claim 2 wherein said software correlator further comprises:
   means for computing accumulations from the correlations using the bit-wise parallelism.

4. The software receiver of claim 3 further comprising:
   application-specific code capable of computing navigation data using the accumulations.

5. The software receiver of claim 1 wherein said means for digitizing comprises:
   means for down-converting the radio signal to an intermediate frequency; and
   a digitizer capable of digitizing the intermediate frequency.

6. The software receiver of claim 5 wherein said digitizer produces at least one bit/sample.

7. The software receiver of claim 5 wherein said digitizer is an analog to digital converter.

* * * * *